United States Patent Office

3,346,651
Patented Oct. 10, 1967

3,346,651
STABILISED VINYLIDENE CHLORIDE MONOMER CONTAINING PARAALKOXY PHENOL AND AMMONIA
John E. Moakes, Fairlight, New South Wales, Australia, assignor to Imperial Chemical Industries Limited, London, England, a corporation of Great Britain
No Drawing. Filed Feb. 27, 1964, Ser. No. 347,714
Claims priority, application Great Britain, Mar. 8, 1963, 9,323/63
8 Claims. (Cl. 260—652.5)

ABSTRACT OF THE DISCLOSURE

There is provided a stabilised vinylidene chloride composition containing paraalkoxy phenols having 1 to 4 carbon atoms in the alkoxy group and ammonia as additives which synergistically are effective in inhibiting prepolymerisation. There is also provided a method by which the inhibited composition is maintained in a state which prevents prepolymerisation by the periodic addition of ammonia.

This invention relates to the stabilisation of vinylidene chloride.

Vinylidene chloride is notoriously unstable in the presence of air, oxygen, and light and hence gradually deposits solid products such as polymeric material, resinous products and products of an acid character. It is necessary therefore that the monomer should be stabilised against formation of such products until such time as the material is required for full scale conversion to the polymeric product.

Paramethoxy phenol when employed alone has the useful feature that it is not necessary to remove this material from the monomer before full scale conversion to the polymer. Thus troublesome washing and distillation procedures to remove the stabiliser ave avoided. However the very stabilising activity itself of paramethoxy phenol is severely limited. Thus an addition of 0.015% to 0.02% w./w. of paramethoxy phenol will only protect the vinylidene chloride in the presence of air for a period of the order of 1 week at ambient temperature and for this reason it is standard practice to store the monomer under nitrogen. Even under commercial nitrogen which contains small amounts of oxygen, for example, 0.2% by weight prepolymerisation occurs in the presence of paramethoxy phenol after about 5–6 weeks. Once this prepolymerisation has started no matter whether the vinylidene chloride has been stored under nitrogen or air it is not possible to obtain a new lease of life equal to that up to the point of prepolymerisation by filtering off the solid products and then adding more paramethoxy phenol. Paramethoxy phenol can thus be said to be more in the nature of a material which retards to a limited extent the prepolymerisation of vinylidene chloride rather than a full scale stabiliser in its own right.

Ammonia when employed alone is a much less useful stabiliser than paramethoxy phenol which itself is of limited use. Thus vinylidene chloride to which 0.001% ammonia is added begins to polymerise after three to four days in the presence of air.

I have now found that vinylidene chloride monomer may be inhibited against prepolymerisation over very long periods of time by supplying to the vinylidene chloride a synergistic combination of a paraalkoxy phenol and ammonia.

According to the present invention therefore I claim a method of inhibiting the prepolymerisation of monomeric vinylidene chloride which comprises incorporating in the vinylidene chloride, paraalkoxy phenol and ammonia, as additions synergistically effective in inhibiting such prepolymerisation.

Suitable paraalkoxy phenols are those containing up to 4 carbon atoms in the alkoxy group. Good results are obtained for example with paramethoxy phenol and paraethoxy phenol. Paramethoxy phenol is preferred.

Vinylidene chloride stabilised with both paramethoxy phenol and ammonia may be stored without prepolymerisation for a period very considerably in excess of the sum of the periods obtained without prepolymerisation when using similar amounts of ammonia alone and when using similar amounts of paramethoxy phenol alone under similar conditions of storage.

Only a small amount of the individual stabilisers in the stabilising system of the present invention are required. Generally at least 0.004% w./w. of the paraalkoxy phenol, for example, the paramethoxy phenol is employed. Good results may be obtained when using 0.005% to 0.025%, for example 0.015% to 0.02% w./w. of this compound. We prefer to employ at least that amount of ammonia corresponding to an alkalinity of 0.0001% w./w. of the monomer (expressed as NaOH). Very good results may be obtained when using an amount of ammonia as low as that corresponding to an alkalinity of 0.0002% to 0.001% (w./w.) (expressed as NaOH), although larger amounts of ammonia of up to 0.01% w./w. (expressed as NaOH) or even higher could be employed.

The present invention is particularly useful in that with the appropriate amount of paramethoxy phenol present in the vinylidene chloride and so long as the alkalinity due to addition of ammonia (expressed as NaOH) is maintained the vinylidene chloride may be stored in air indefinitely or certainly at least for periods considerably in excess of 4 months. The present invention also has the advantage that if on adding to vinylidene chloride a certain amount of paramethoxy phenol and ammonia the alkalinity of the stabilised monomeric composition falls on storage to an undesirably low level, for example, on storing in air for long periods at elevated temperatures, then all that is required to give an extra lease of storage life is to pass again into the vinylidiene chloride a small amount of ammonia. Further if vinylidene chloride monomer has been stabilised with paramethoxy phenol alone (not according to the invention) then at the onset of deposition the deposited solid products can be filtered off and ammonia can be passed ino the liquid vinylidene chloride still containing paramethoxy phenol to give a material of outstanding stability. The present invention in fact avoids the troublesome procedure of storing the monomer under nitrogen. Again paramethoxy phenol in the synergistic combination with ammonia does not have to be removed from the monomer before full scale conversion to the polymer.

The present invention also envisages monomeric vinylidene chloride which contains as additions synergistically effective in inhibiting the prepolymerisation of vinylidene chloride, paraalkoxy phenol and ammonia.

It is to be noted that in addition to the synergistic combination of paramethoxy phenol and ammonia other materials which in their own right are stabilisers for vinylidene chloride may be incorporated in the monomer, for example phenol. When the latter material is employed in the synergistic combination it is necessary to remove said material before full scale conversion to the polymeric product is effected. This can be achieved by fractional distillation of vinylidene chloride to leave the stabilisers as a residue.

The present invention further envisages the polymerised vinylidene chloride obtained by full scale conversion from monomeric vinylidene chloride which contains or has contained paraalkoxy phenol and ammonia.

The following example illustrates but does not limit the invention.

EXAMPLE 1

A large sample of 400 lbs. of vinylidene chloride was taken which on analysis was found to contain approximately 99.3% vinylidene chloride, 0.35% dichloroethylene and 0.25% 1:1-dichloroethane and 0.1% trichloroethylene. To this sample was incorporated specified amounts of paramethoxy phenol and ammonia (expressed as NaOH) and the resulting material was tested for stability against prepolymerisation. This vinylidene chloride was stored in a 50 gallon drum with a 10% by volume free air space. Another sample of vinylidene chloride stabilised in this manner was stored in the drum under nitrogen. Two different storage temperatures were employed. The results are indicated in the Table I.

TABLE I

| Stabiliser | Storage Life in air at— | Storage Life under $N_2$ at— |
|---|---|---|
| p-Methoxy phenol (0.015% w./w.). Ammonia (expressed as .001% NaOH). | (15° C.)—4 months | |
| p-Methoxy phenol (0.019% w./w.). Ammonia (expressed as .001% NaOH). | (0 to 10° C.)—4 months. | (0 to 10° C.)—Alkalinity still high (.0008% NaOH). No sign of prepolymerisation after 4 months. Indefinite life anticipated. |
| p-Methoxy phenol (0.019% w./w.). Ammonia (expressed as .017% NaOH). | (0 to 10° C.)—no sign of prepolymerisation after 4 months. | |

Comparison

By way of comparison similar samples of vinylidene chloride with which was incorporated ammonia alone and p-methoxy phenol alone were tested under similar conditions for stability against prepolymerisation. The results are indicated in Table II.

TABLE II

| Stabiliser | Storage Life in air at— | Storage Life under nitrogen at— |
|---|---|---|
| p-Methoxy phenol (0.015% w./w.). | (15° C.)—10 days | (15° C.)—42 days. |
| Ammonia (expressed as 0.0013% NaOH). | (15° C.)—4 days | |

The tables illustrate the improved storage life obtained with the combination of paramethoxy phenol and ammonia as compared with the sum of the periods of storage lines obtained with paramethoxy phenol alone and with ammonia alone. Table II also illustrates that paramethoxy phenol is not very useful as a stabiliser for vinylidene chloride when the latter is stored in air.

What I claim is:

1. A stabilised vinylidene chloride composition comprising monomeric vinylidene chloride and a paraalkoxy phenol having 1 to 4 carbon atoms in the alkoxy group and ammonia as additives synergistically effective in inhibiting prepolymerisation.
2. A composition as claimed in claim 1 wherein the paraalkoxy phenol is paraethoxy phenol.
3. A composition as claimed in claim 1 wherein the paraalkoxy phenol is paramethoxy phenol.
4. A composition as claimed in claim 3 wherein at least 0.004% and up to 0.025% w./w. of the monomer of paramethoxy phenol is employed.
5. A composition as claimed in claim 3 wherein at least 0.0001% and up to 0.01% w./w. of the monomer of ammonia (expressed as NaOH) is employed.
6. A composition as claimed in claim 3 wherein in addition to the synergistic combination of paramethoxy phenol and ammonia there is also incorporated phenol.
7. A method of inhibiting the prepolymerisation of monomeric vinylidene chloride comprising adding to the vinylidene chloride a composition comprising a paraalkoxy phenol having 1 to 4 carbon atoms in the alkoxy group and ammonia, and periodically adding additional ammonia, whereby the storage life of the stabilised vinylidene chloride is increased.
8. The metthod of claim 7 wherein the concentration of the ammonia in the said composition produces an alkalinity of at least 0.001% w./w. of the vinylidene chloride, expressed as NaOH, and the additional ammonia added maintains the said concentration.

References Cited

UNITED STATES PATENTS 3,062,900  11/1962  Coover et al. _____ 260—652.5

DONALD E. CZAJA, *Primary Examiner.*

LEON J. BERCOVITZ, *Examiner.*

V. P. HOKE, *Assistant Examiner.*